No. 624,777. Patented May 9, 1899.
A. V. FAUSEK.
SUPPLY REGULATOR FOR WATER FILTERS.
(Application filed May 11, 1898.)
(No Model.) 2 Sheets—Sheet I.
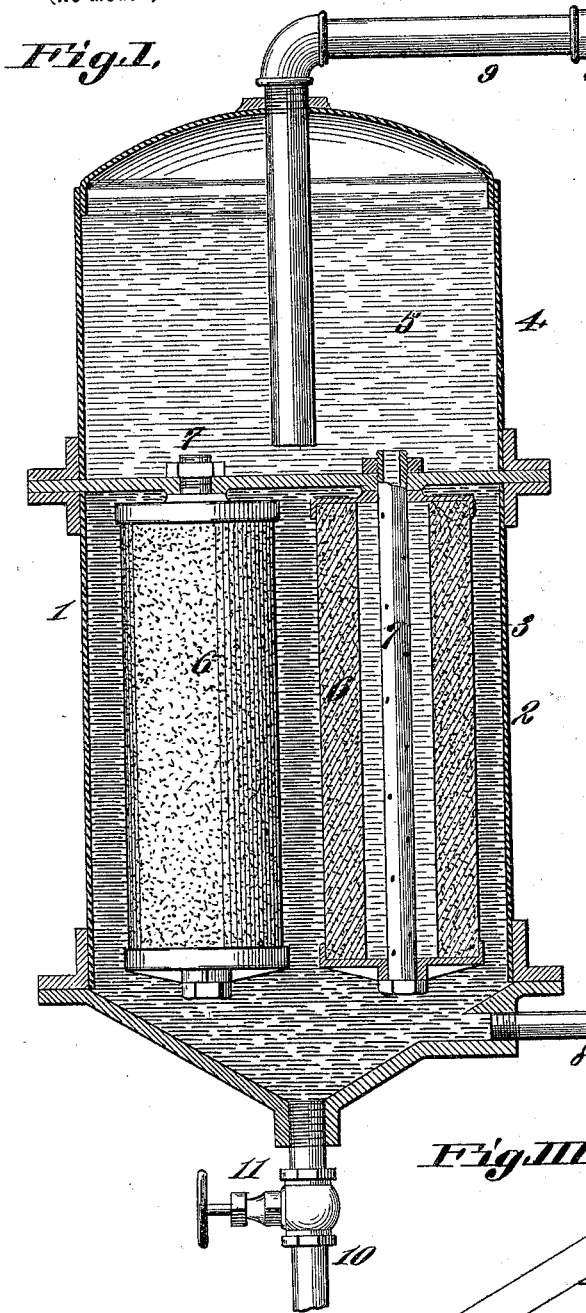
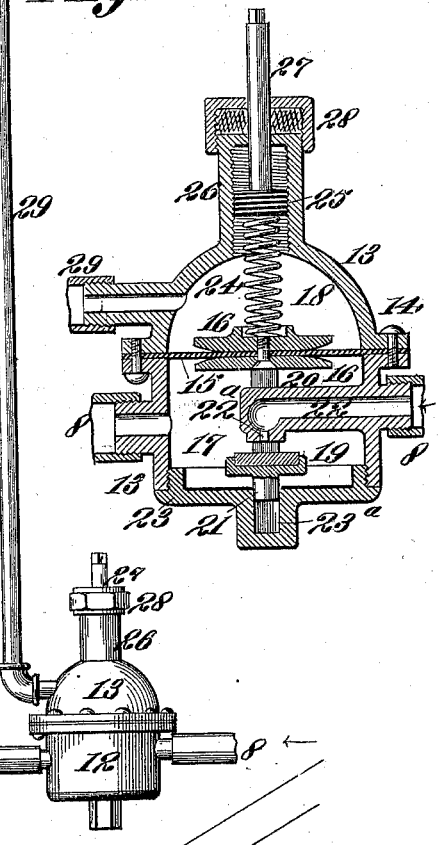
WITNESSES:
INVENTOR
Alexander V. Fausek.
BY
ATTORNEYS

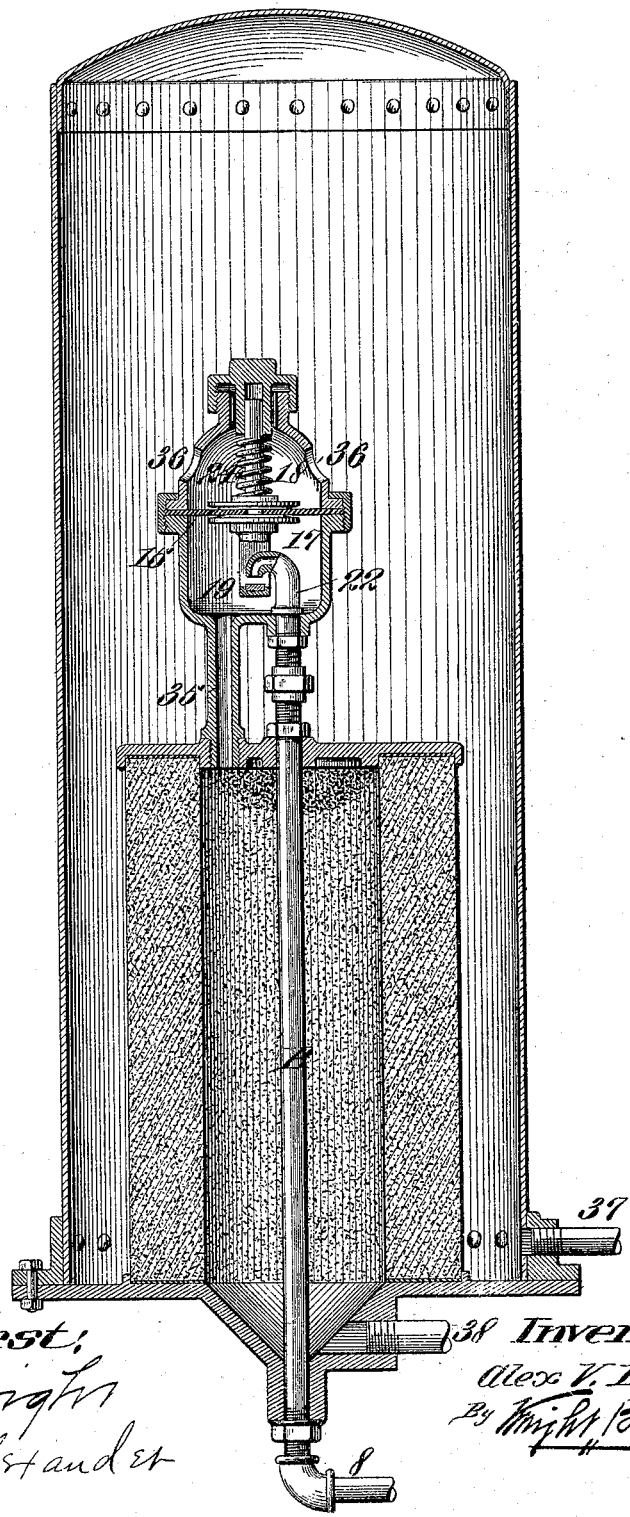

UNITED STATES PATENT OFFICE.

ALEXANDER V. FAUSEK, OF ST. LOUIS, MISSOURI, ASSIGNOR TO THE AMERICAN TRIPOLI COMPANY, OF MISSOURI.

SUPPLY-REGULATOR FOR WATER-FILTERS.

SPECIFICATION forming part of Letters Patent No. 624,777, dated May 9, 1899.

Application filed May 11, 1898. Serial No. 680,366. (No model.)

*To all whom it may concern:*

Be it known that I, ALEXANDER V. FAUSEK, a citizen of the United States, residing at the city of St. Louis, in the State of Missouri, have invented a certain new and useful Improvement in Methods of and Apparatus for Supplying Water to Filters, of which the following is a full, clear, and exact description, reference being had to the accompanying drawings, forming a part of this specification.

It is now a well-recognized requirement of a successful filter that the force on the receiving side of the filter shall be kept down to a pressure relatively low as compared with the hydrant force, so that the sediment shall not be deposited against the filtering stones or material by as much force as is exerted to remove the sediment when the reverse flow of water through the filter is established for the purpose of cleansing the stones, the sediment thereby being easily removed not only from the surface of the stones, but from the pores thereof, into which it has not been driven with as much force as is exerted to drive it out, the stones being thus readily and easily cleaned by simply opening a valve in the waste-pipe to permit a reflux of water through the filter. This reduction of the water-pressure on the receiving side of the filter has been attempted by the use of very small pipes, and also by the use of disks placed in the pipes, with very small perforations through which the water has to pass, to both of which there are objections, the two principal ones being the clogging of the small pipes or of the perforations in the disks, thus shutting off the supply of water, and, second, the inability of adjusting the flow of water (as some waters may be permitted to flow faster than others through the filtering-stone without danger of clogging the latter) without substituting another pipe or another disk, and this might have to be done frequently to get the best results out of the filters—as, for instance, when water from a river is being filtered—as the condition of the water in most rivers changes with the rise and fall of the river.

It is the object of my invention to furnish a method for and provide a device that will cause the water to be delivered to the filter under a low predetermined pressure and to provide such a device that will be free of the objections existing in other devices.

My invention consists in features of novelty hereinafter fully described, and pointed out in the claims.

Figure I is a vertical section of a water-filter provided with my regulator, which is shown in elevation. Fig. II is a vertical section of the regulator. Fig. III is a diagram. Fig. IV illustrates a modification.

I will proceed to describe my improved apparatus, which will make clear my improved method.

Referring to the drawings, 1 represents a water-filter, which may be of any form or construction. It has a part 2, forming a muddy-water space 3, and a part 4, forming a clear-water space 5. Within the space 2 are the stones or material 6, through which the water filters. I have shown the stones hollow, and within them are perforated tubes 7, through which the water after being filtered passes to the space 5, as will be readily understood.

8 is a supply-pipe through which water passes to the filter and which forms a connection between the filter and the water-main or source of supply.

9 is a pipe through which clear water is drawn from the filter.

10 is a waste-pipe communicating with the muddy-water space of the filter and which leads to a suitable place of discharge, such as to a sewer. In the pipe 10 is a valve 11.

12 represents my regulator, which is placed in the pipe 8. It consists of a housing 13, preferably made in two parts secured together by bolts or rivets 14, and between the two parts of the housing is placed a flexible diaphragm 15, on either side of which I preferably place a metallic washer 16. Beneath the diaphragm 15 is a chamber 17, and above the diaphragm is a chamber 18. The pipe 8 communicates with the chamber 17, as shown in Fig. II.

Located in the chamber 17 is a valve 19, connected by arms 20 to the diaphragm 15 or to the lower disk 16, the other side of the valve being provided with a short stem 21, fitting in a socket 23ª in the head 23 of the housing for the purpose of guiding the valve.

The housing has an internal hollow extension 22, with which the pipe 8 on the receiving side of the regulator connects. This hollow extension has an opening 22ª, which is controlled by the valve 19. The part of the projection 22 in which the opening 22ª is formed is made to form a seat for the valve.

In the chamber 18 is located a spring 24, one end of which rests against the diaphragm 15, the upper disk 16 being interposed between them when such disk is used. The other end of the spring 24 bears against a plug 25, tapped into a neck 26 on the housing 13. The plug is provided with a stem 27, that extends out through a stuffing-box on the neck 26. By adjusting the plug in and out the tension of the spring 24 may be regulated to obtain any force which may be determined upon as necessary or desirable. The action of the spring 24 is to hold the valve 19 from its seat, in which position it is shown in Fig. II.

When water is turned on in the supply-pipe, it flows through the opening 22ª into the chamber 17 and on into the filter, and, passing through the filtering-stones, enters the clear-water space 5. As the water cannot pass as rapidly through the stones as it passes through the supply-pipe, there will of necessity be a back pressure, and as this pressure exerts its force against the diaphragm 15 it closes the valve 19 against the pressure of the spring 24 and shuts off the supply of water until this pressure is reduced by the water filtering through the stones, and when the pressure is reduced to a point below the force of the spring 24 the valve will open again, admitting more water, and thus the flow of water is automatically controlled and its force against the stones cannot exceed the pressure of the spring 24, no matter what the pressure may be in the pipe 8 on the receiving side of the regulator—as, for instance, if the pressure in the supply-pipe on the receiving side of the regulator is forty pounds and the force of the spring 24 is adjusted to four pounds there can never be more than four pounds of pressure on the receiving or muddy-water side of the stones, so that the mud and sediment is not driven forcibly into the pores of the stones nor packed tightly against the outer surface or the stones.

29 represents a pipe connecting the clear-water space 5 of the filter with the chamber 18 of the regulator. The pipe may extend directly to the part 4 of the filter or may be connected to the discharge-pipe 9, as shown in the drawings. By providing this pipe a communication is established between the clear-water side of the filter and the regulator, so that whatever pressure is established on the clear-water side of the filter is maintained in the chamber 18, so as to permit the operation of the valve until the water on the clear-water side of the filter reaches the hydrostatic pressure in the supply-pipe. This will be readily understood by referring to the diagram Fig. III, where A may represent the bottom line of the clear-water chamber, B a line representing the clear-water pressure, and C a line representing the hydrostatic pressure. In the absence of the connection between the regulator and the clear-water side of the filter the water could only rise in the clear-water chamber until it reached a pressure equal to the force of the spring 24, which height may be illustrated by the dotted line D, Fig. III; but by providing the connection between the regulator and the clear-water side of the filter the water on the clear-water side can rise until it reaches a pressure that equals the hydrostatic pressure in the supply-pipe, so that if the hydrostatic pressure is forty pounds and the spring 24 exerts a force of four pounds the water in the clear-water side of the filter can be raised to a pressure of forty pounds to the square inch, and yet there will never be more than four pounds pressure exerted on the muddy-water side of the filtering-stones, so that when the valve 11 in the waste-pipe 10 is opened clear water will flow back through the filtering-stones under forty pounds pressure, thus removing all sediment from the pores and outer surfaces of the stones, which has been deposited under only four pounds pressure.

In the modification illustrated in Fig. IV the regulator is shown as located within the clear-water chamber of the filter. The same reference-numerals are applied to the different parts of the regulator in this figure as are used in Fig. II. The supply-pipe extends up through the filtering-stone, as shown at B, and the regulator has a tube 35, which conducts the water from the muddy-water side of the regulator to the interior of the stone, from whence it filters outwardly to the clear-water space of the filter. The clear-water side of the regulator has perforations or openings 36 to permit the clear water to enter the chamber 18 of the regulator. The operation of the regulator is, as will be readily understood, the same in this instance as when arranged as shown in Figs. I and II.

37 represents the clear-water-discharge pipe, and 38 the waste-pipe.

I claim as my invention—

1. The method of preventing the clogging of filters by excessive pressure on the dirty-liquid side of the filter, which method consists in delivering the dirty liquid to the filter under pressure and causing the pressure on the clear-liquid side to control the pressure on the dirty-liquid side, whereby the variation between the two pressures in maintained within a determined limit.

2. In a water-filter, a clear-water chamber, a muddy-water chamber, filtering material through which the water passes from the muddy-water chamber to the clear-water chamber, a supply-pipe, and a pressure-operated valve located in the supply-pipe, whereby the difference that may occur between the pressures on the two sides of the filtering medium is automatically controlled during the filtering operation whatever may be the pressure in the supply-pipe, substantially as set forth.

3. In a water-filter, a clear-water chamber, a muddy-water chamber, filtering material through which the water passes from the muddy-water chamber to the clear-water chamber, a supply-pipe, and a pressure-regulator located in the supply-pipe and consisting of a housing having a valve-seat, a flexible diaphragm carrying a valve, and a spring exerting its force to open said valve, substantially as and for the purpose set forth.

4. In a water-filter, a clear-water chamber, a muddy-water chamber, filtering material through which the water passes from the muddy-water chamber to the clear-water chamber, a supply-pipe, a pressure-operated valve located in said supply-pipe, and a communication between said valve and the clear-water chamber, substantially as and for the purpose set forth.

5. In a water-filter, a clear-water chamber, a muddy-water chamber, filtering material through which the water passes from the muddy-water chamber to the clear-water chamber, a supply-pipe, and a pressure-regulator located in the supply-pipe and consisting of a housing having a valve-seat, a flexible diaphragm dividing the housing into two compartments, a valve carried by said diaphragm and fitting in the compartment of the housing with which the supply-pipe communicates, a spring exerting its force to move the valve away from its seat; and a pipe forming a communication between said clear-water chamber and the compartment of the housing that is on the opposite side of the diaphragm from said valve, substantially as set forth.

6. In a water-filter, a clear-water chamber, a muddy-water chamber, filtering material through which the water passes from the muddy-water chamber to the clear-water chamber, a supply-pipe, a pressure-operated valve located in said supply-pipe, a pipe connecting said valve with said clear-water chamber, and means for regulating the pressure of said valve, substantially as set forth.

ALEXANDER V. FAUSEK.

In presence of—
   E. S. KNIGHT,
   N. V. ALEXANDER.